United States Patent [19]

Stanage et al.

[11] Patent Number: 5,078,359
[45] Date of Patent: Jan. 7, 1992

[54] MOUNTING MEANS FOR A FUEL CONTROL

[75] Inventors: Nickie L. Stanage, Cassopolis; George S. Wieger, Niles, both of Mich.

[73] Assignee: Allied-Signal Inc., Morristown, N.J.

[21] Appl. No.: 537,552

[22] Filed: Jun. 13, 1990

[51] Int. Cl.⁵ ............................................. F16M 13/00
[52] U.S. Cl. .................................... 248/674; 248/68.1; 248/680; 248/231.3; 248/316.2
[58] Field of Search .................. 248/674, 68.1, 680, 248/681, 231.3, 316.2; 123/456

[56] References Cited

U.S. PATENT DOCUMENTS

| 4,805,575 | 2/1989 | deConcini et al. | 123/456 X |
| 4,934,329 | 6/1990 | Cean et al. | 123/456 X |

Primary Examiner—Alvin C. Chin-Shue
Attorney, Agent, or Firm—Leo H. McCormick, Jr.; Larry J. Palguta

[57] ABSTRACT

Mounting means for attaching a control module (12) to a engine to develop a uniform force that seals fluid connections of passageways therebetween. A block (10) secured to the engine (14) has a series of parallel slots (30, 30' ... 30ᴺ) on opposite first (26) and second (28) sides of and perpendicular to a base surface (24). The block (10) has external flanges (32, 34) adjacent to the slots (30, 30' ... 30ᴺ) that are parallel to the base surface (24). Legs (64, 64' ... 64ᴺ) on the control module (12) which are located in the slots (30, 30' ... 30ᴺ) have an external projections (68, 68' ... 68ᴺ). First (40) and second (42) bars positioned on opposite sides of the block (10) engage the external flanges (32, 34) and projections (68, 68' ... 68ᴺ). When bolts (52, 52' ... 52ᴺ) that extend through the first bar (40) and block (10) and threaded into the second bar (42) and block (10) are tightened, a closure force is created by a wedge action between the first (40) and second (42) bars and external flanges (34, 34) and projections (68, 68' ... 68ᴺ) to uniformly seal the fluid connections.

7 Claims, 2 Drawing Sheets

MOUNTING MEANS FOR A FUEL CONTROL

This invention relates to a mounting arrangement for securing a fuel control to an engine.

When a fuel control is attached to an engine it is common practice to use a plurality of bolts that are screwed into a mounting block. Each bolt is uniformly torqued to assure substantially equal forces are applied to the control to seal the various fluid connection that provide an input to or receive an output from the fuel control. It is normal to have the conduits that carry fuel to the engine directly connected to either a mounting block or the fuel control. In an effort to reduce the number of bolts required to attach a fuel control to a mounting block, an arrangement known as a Marman flange has been used on several engines. In this arrangement, the fuel control has a circular housing and a band clamps the fuel control to the mounting block.

Recently, some airlines and engine manufacturers have expressed a desire to have the ability to more easily install and remove a fuel control module from an engine. The location and number of bolts used to connect fuel control modules on engines and often times the disconnection of the fuel supply lines from the control modules is time consuming.

In the present invention, it is proposed that the control module be the only component that is removed and replaced for maintenance. A mounting block fixed to the engine has internal passageways extending from permanent connections with the fuel supply, the combustion chamber and various input regulators. The mounting block has a first surface with various openings connected to the internal passageways and a plurality of external slots located on opposite first and second side walls. A flange with a first tapered surface is located adjacent said slots on the first and second walls. Legs which extend from a second surface on the fuel control module are located in the plurality of slots. The legs have a projection with a second tapered surface thereon. First and second bars are positioned on the first and second walls. When bolts which pass through the first and second bars are tightened, the first and second bars engage the first and second tapered surface to create a wedge force that is transferred to move the first and second surfaces into sealing engagement such that the openings in the mounting block are aligned with corresponding openings in the control module.

It is an object of this invention to provide an attachment means whereby a control module is attached to an engine through the use of a wedge lock system.

An advantage of this invention resides in the ease through which a control module is installed and removed from a mounting block fixed to an engine.

It is another object of this invention to provide an engine having a mounting block through which various conduits are permanently attached with a means for attaching a control module for operating the engine.

These advantages and objects should be apparent from reading this specification while viewing the drawings wherein.

Figure 4:
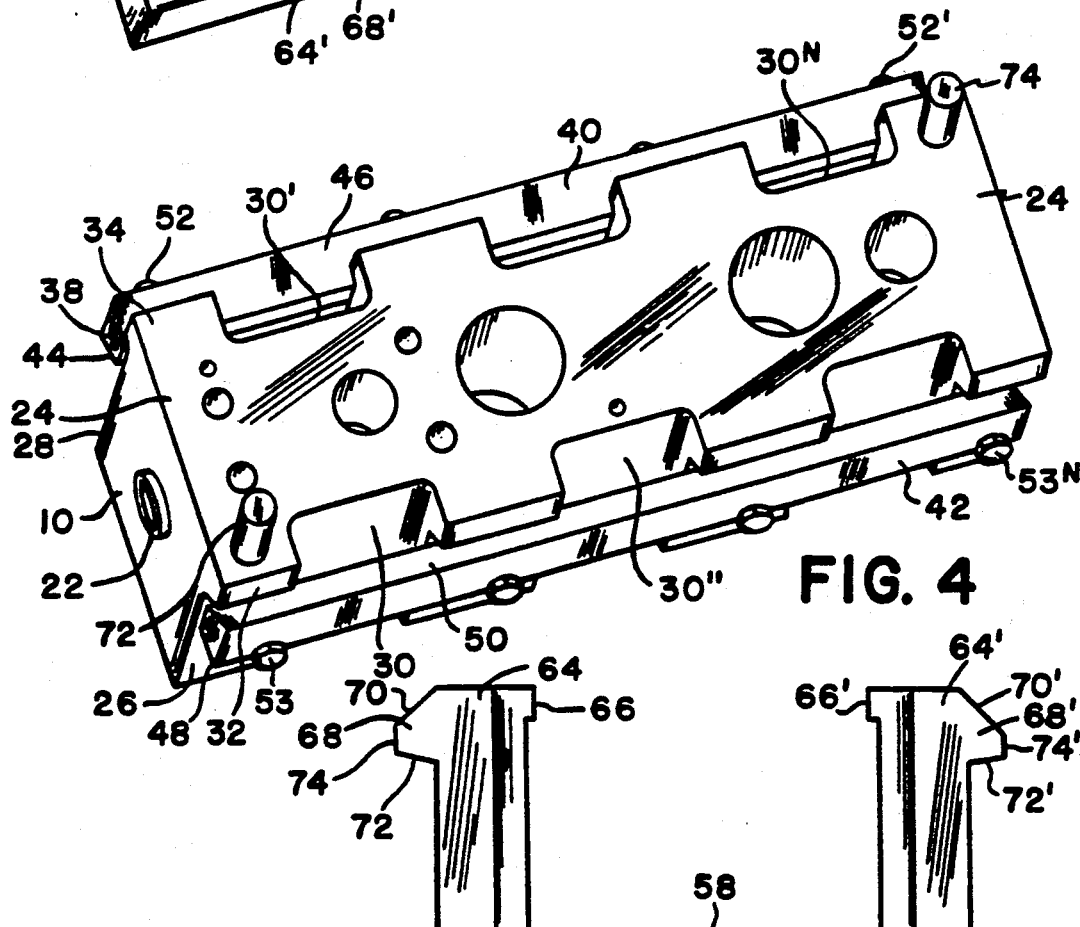
FIG. 4 is a perspective of the mounting block that is fixed to the engine.

The mounting block 10 with the fuel control module 12 attached thereto is fixed to an engine housing 14 by a plurality of bolts 16, 16'... $16^N$. Conduit 18 connected to a fuel supply is bolted or hard connected to the mounting block 10 while conduit 20 communicates fuel to the combustion chamber of the engine. Conduits 22, 22'... $22^N$ connect the mounting block 10 with various devices that provide an input to the control module 12 for operating the engine. The mounting block 10 has a plurality of internal passageways that extend the conduits 18, 20, and 22, 22'... $22^n$ to surface 24 as a series of openings as shown in FIG. 4. Mounting block 10 has first and second side walls 26 and 28 with a series of parallel slots 30, 30'... $30^N$ which are perpendicular to surface 24. Flanges 32 and 34 which extend along walls 26 and 28 and are perpendicular to the parallel slots 30, 30'... $30^N$ have tapered surfaces 36 and 38 thereon, respectively. Tapered surfaces 36 and 38 have a slope of approximately 15 degrees such that an angle of approximately 105 degrees is formed between walls 26 and 28 with the flanges 32 and 34.

A plurality of bolts or other fastener means 52, 52'... $52^N$, which extend through mounting block 10, position bars 40 and 42 on walls 26 and 28. The bars 40 and 42 have tapered surfaces 44, 46 and 48, 50 which are complementary to the tapered surfaces 36 and 38 on flanges 32 and 34 and tapered surfaces 72, 72'... $72^N$ on legs 64, 64'... $64^N$. Resilient means or springs 54 and 56 located between the bars 40 and 42 keep the bars 40 and 42 away from the walls 26 and 28. Nuts 53, 53'... $53^N$ on bolts or fastener means 52, 52'... $52^N$ are screwed into correspondingly aligned threads 57, 57'... $57^N$ on bar 42 and a locking nut 55 attached to each bolt or fastener means 52, 52'... $52^N$. With the fastener means 52, 52'... $52^N$ positioned on the mounting block 10 and all the conduits from the fuel supply and various input parameters fixed to the mounting block 10, the control module 14 is easily removed and replaced.

Figure 1:
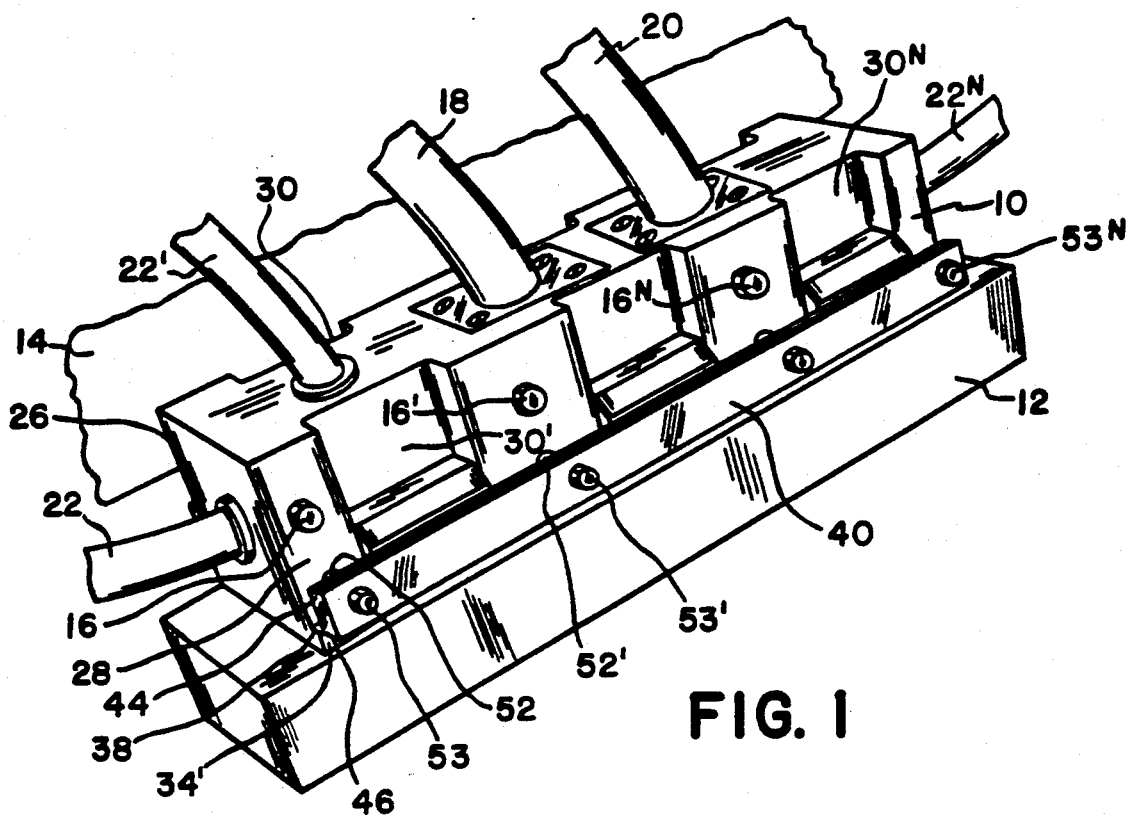
FIG. 1 is a perspective view of a mounting block with a fuel module attached thereto in accordance with the principles of the proposed invention.
Figure 2:
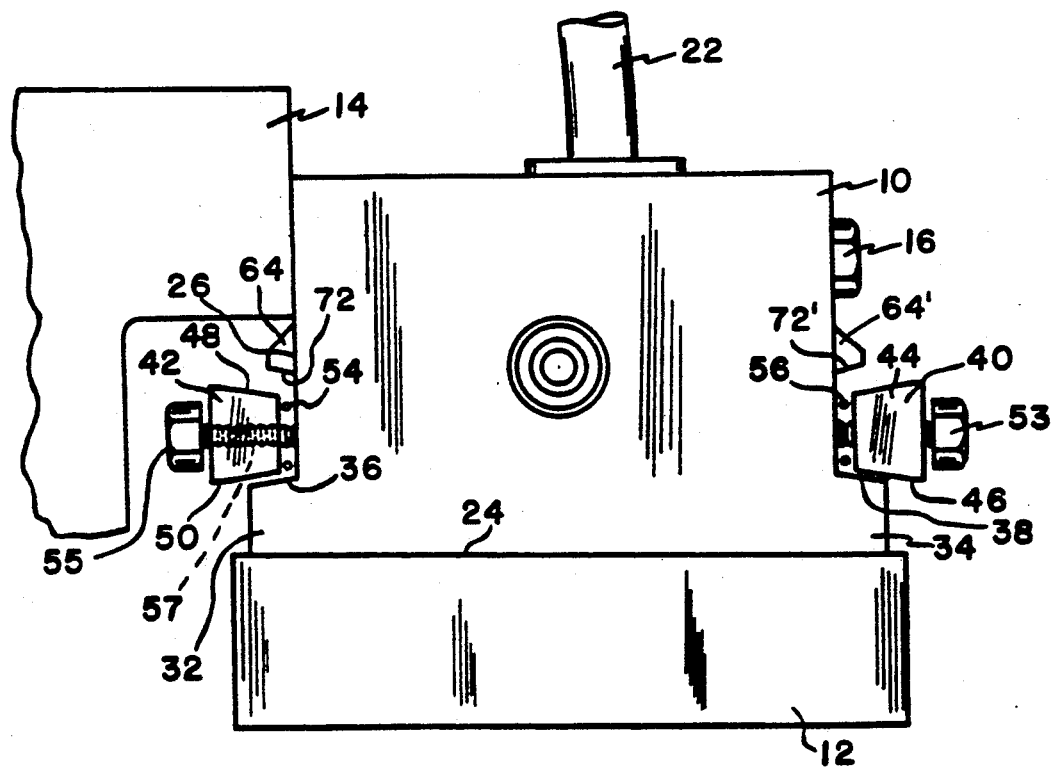
FIG. 2 is an end view of the mounting block and fuel module of FIG. 1.
Figure 3:
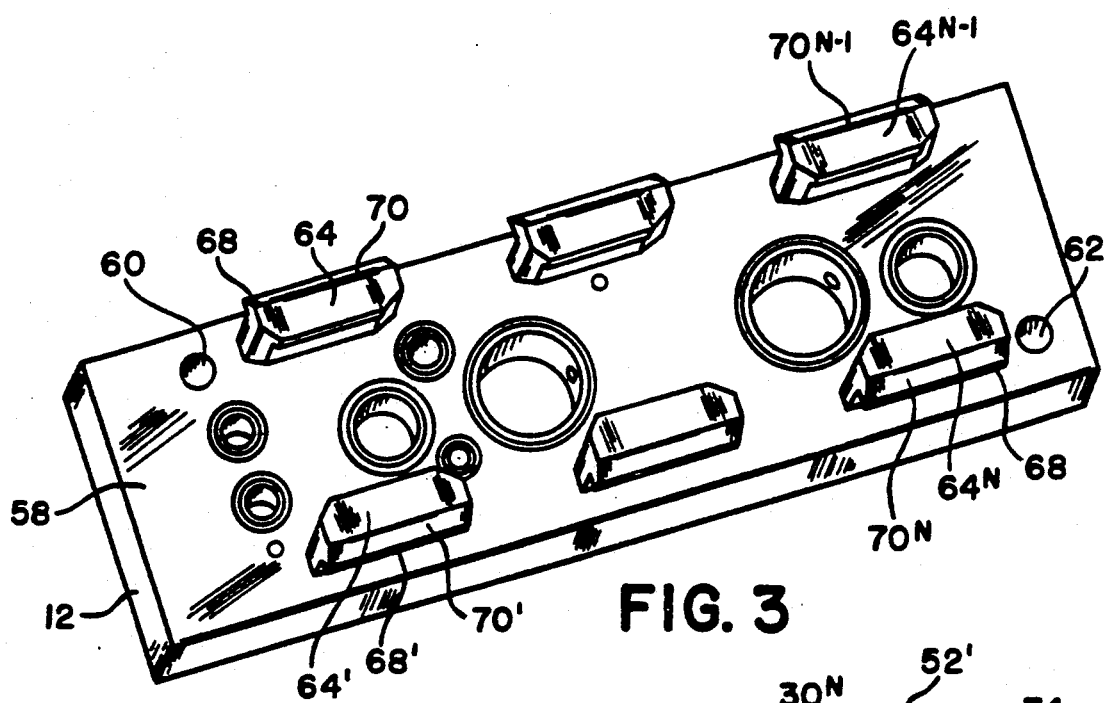
FIG. 3 is a perspective view of the top of the fuel module showing the attachment legs that extend from a sealing surface.
Figure 5:
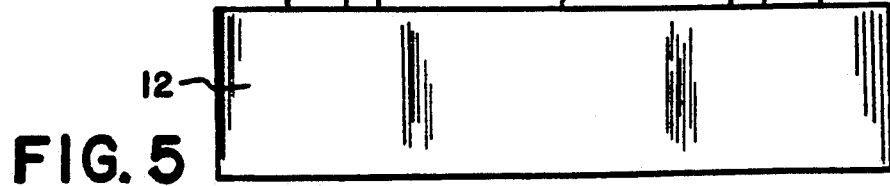
FIG. 5 is an end view of the fuel module of FIG. 3 showing the attachment legs.

The control module 12 as best seen in FIGS. 3 and 5 has a surface 58 with openings corresponding to the openings in the surface 24 on the mounting block 10 and guide openings 60 and 62. A plurality of legs 64, 64'... $64^N$ which perpendicular to surface 58 each have a corresponding stop surface or rib 66 opposite a leg flange 68. A first slope or slant 70 on each leg flange tab 68 terminates in a flat 74 and a second taper, slope or slant 72 that corresponds to tapers 46 and 50 on the reinforcing bars 40 and 42 terminates on the body of each leg 64, 64'... 64n. On insertion of legs 64, 64'... $64^N$ in corresponding slots 30, 30'... $30^N$, tapered pins 72 and 74 are located in openings 60 and 62. Thereafter, tapered surfaces 70, 70' and $70^N$ engage and move the bars 40 and 42 to allow flat 74 on each leg to move past the bars 40 and 42. Once flat 74 on each leg 64 has been moved past the bars 40 or 42, tapered surfaces 72 engage corresponding tapered surfaces 44 and 48 to provide a first lock that holds the control module 12 on the mounting block 10. Thereafter, a predetermined torque is applied to nuts 53, 53'... 53n to move bolts or fastener means 52, 52'... $52^N$ with respect to threads 57, 57'... 57n and move the bars 40 and 42 toward the mounting block 10. As the bars 40 and 42 move toward the mounting block 10, tapered surface 72 on each leg 64 engages tapered surface 44 or 48 on bar 40 or 42 while tapered surface 46 or 50 on the bars engage tapered surface 36 or 38 of flange 32 or 34 on the reinforcing block 10 to create a closure force that moves the control module 12 toward the mounting block 10. The bars 40 and 42 uniformly transfers the closure force to the flanges 32 and 34 to develop a fluid seal when surface 58 engages surface 24. The component of the separation forces developed by the fluid pressure in the fluid supplied through the mounting block 10 for distribution to the control module 12 and transferred through the tapered surfaces as an expansion force are nullified as resistance of the expansion force in the fastener means or bolts 52, 52'... 52$^N$.

When it is desired to remove the control module 12 from the engine, fastener means or bolts 52, 52'... 52$^N$ are loosened and springs 54 and 56 move bars 40 and 42 away from the mounting block 10. An end nut 53 which is secured to each bolt 52 limits the amount that the bars 40 and 42 will be moved with respect to the mounting block 10 such that the bars 40 and 42 remain a part of the mounting block 10 once installed thereon. The control module 12 is thereafter separated from the mounting block 10 and different control module 12 attached to the mounting block 10 to complete a replacement thereof without the need to change or disconnect any of the various fluid conduits 18, 20 and 22, 22'... 22$^N$ associated with the operation of the engine.

We claim:

1. Mounting means for connecting a component to an engine comprising:
   a block fixed to said engine and having passageways therein connected to various conduits associated with the operation of the engine, said block having a first surface thereon with a plurality of openings associated with the passageways, said block having a series of parallel slots on opposite first and second sides that are Perpendicular to said first surface, said block having external flanges adjacent each slot;
   legs extending from a second surface on said component and located in said plurality of slots, each leg having a projection extending therefrom;
   first and second bars positioned on said opposite first and second sides of said block and engaging said external flanges on said block and projection on each leg; and
   fastener means connected to said block for moving first and second bars toward the block causing said bars to wedge between said external flanges on said block and external projection of the legs to bring said first and second surfaces on said block and component into sealing engagement.

2. The mounting means as recited in claim 1 wherein said block further includes:
   pins which engage said component to aid in aligning said first and second surfaces on insertion of said legs in said slots.

3. The mounting means as recited in claim 2 wherein each of said external flanges is characterized by a first tapered surface, said external projection is characterized by a second tapered surface and first and second bars have corresponding tapered surfaces thereon which form said wedge to develop a closure force that holds the component on the block.

4. The mounting means as recited in claim 3 wherein first and second bars uniformly distribute the closure force to the block and component.

5. The mounting means as recited in claim 4 wherein said fastener means includes:
   bolts that extend through said first bar and block and are threaded into said second bar, and
   lock nuts on said bolts that inhibit removal once the first and second bars are installed on said block.

6. The mounting means as recited in claim 5 wherein said fastener means further includes:
   resilient means for urging said first and second bars away from said block during installation of said legs in said slots.

7. The mounting means as recited in claim 6 wherein said legs include:
   reinforcing ribs that provide strength and a mechanical stop to prevent deflection when the closure force is achieved.

* * * * *